US012577265B2

(12) United States Patent
Sakuta

(10) Patent No.: US 12,577,265 B2
(45) Date of Patent: Mar. 17, 2026

(54) ISOCYANATE GROUP-CONTAINING ORGANOSILICON COMPOUND AND METHOD FOR PRODUCING ISOCYANATE GROUP-CONTAINING ORGANOSILICON COMPOUND

(71) Applicant: SHIN-ETSU CHEMICAL CO., LTD., Tokyo (JP)

(72) Inventor: Koji Sakuta, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 769 days.

(21) Appl. No.: 17/800,870

(22) PCT Filed: Feb. 1, 2021

(86) PCT No.: PCT/JP2021/003594

§ 371 (c)(1),
(2) Date: Aug. 18, 2022

(87) PCT Pub. No.: WO2021/181941

PCT Pub. Date: Sep. 16, 2021

(65) Prior Publication Data

US 2023/0092712 A1 Mar. 23, 2023

(30) Foreign Application Priority Data

Mar. 9, 2020 (JP) ................................ 2020-039997

(51) Int. Cl.
*C07F 7/08* (2006.01)

(52) U.S. Cl.
CPC .......... *C07F 7/0838* (2013.01); *C07F 7/0889* (2013.01)

(58) Field of Classification Search
CPC ...... C07F 7/0838; C07F 7/0889; C08G 77/26; C08K 5/5465
See application file for complete search history.

(56) References Cited

U.S. PATENT DOCUMENTS

| | | | | |
|---|---|---|---|---|
| 3,859,321 A * | 1/1975 | Traver | C10M 3/00 | 252/78.3 |
| 5,616,756 A * | 4/1997 | Nakashima | C08G 77/38 | 556/451 |
| 5,703,159 A * | 12/1997 | Ichinohe | C08G 77/50 | 525/440.03 |
| 2006/0058488 A1 | 3/2006 | Kuhnle et al. | | |
| 2008/0183001 A1 | 7/2008 | Tsudera et al. | | |
| 2020/0040124 A1 | 2/2020 | Azuma et al. | | |

FOREIGN PATENT DOCUMENTS

| | | |
|---|---|---|
| CN | 109843952 A | 6/2019 |
| EP | 0718345 A1 | 6/1996 |
| JP | H08-104755 A | 4/1996 |
| JP | H08-157728 A | 6/1996 |
| JP | 2000-178284 A | 6/2000 |
| JP | 2001-026593 A | 1/2001 |
| JP | 3440645 B2 | 8/2003 |
| JP | 2007-326841 A | 12/2007 |

OTHER PUBLICATIONS

A. J. Barry, 17 Journal of Applied Physics 1020-1024 (1946)("Barry") (Year: 1946).*

Oct. 30, 2024 Office Action issued in Chinese Patent Application No. 202180019374.6.

Jan. 9, 2025 Office Action issued in Chinese Patent Application No. 202180019374.6.

Apr. 9, 2024 Office Action and Search Report issued in Chinese Patent Application No. 202180019374.6.

Apr. 15, 2024 Search Report issued in European Patent Application No. 21766833.4.

Mar. 30, 2021 International Search Report issued in International Patent Application No. PCT/JP2021/003594.

Sep. 6, 2022 International Preiminary Report on Patentability issued in International Patent Application No. PCT/JP2021/003594.

* cited by examiner

*Primary Examiner* — Alexander R Pagano
*Assistant Examiner* — Frank S. Hou
(74) *Attorney, Agent, or Firm* — Oliff PLC

(57) ABSTRACT

An isocyanate group-containing organosilicon compound shown by the following general formula (1), and having three or more $R^2$ groups per molecule and a viscosity at 25° C. of 100 $mm^2/s$ or less. This provides an organosilicon compound which has three or more isocyanate groups per molecule, and which is suitable as a crosslinking agent, low in viscosity, and excellent in handleability. $R^1_aR^2_bSiO_{(4-a-b)/2}$ (1), where each $R^1$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; and $R^2$ represents an organic group shown by a formula —$CH_2CH_2Si(CH_3)_2OSi(CH_3)_2CH_2CH_2CH_2NCO$.

2 Claims, No Drawings

ISOCYANATE GROUP-CONTAINING ORGANOSILICON COMPOUND AND METHOD FOR PRODUCING ISOCYANATE GROUP-CONTAINING ORGANOSILICON COMPOUND

TECHNICAL FIELD

The present invention relates to an organosilicon compound having three or more isocyanate groups per molecule and low viscosity.

BACKGROUND ART

An isocyanate group can form urethane bond or urea bond by reaction with an organic functional group, such as a hydroxyl group and an amino group, having active hydrogen. Compounds having such a functional group are useful as synthetic materials for various polymers and as polymer modifiers.

Traditionally, such compounds having an isocyanate group have been produced by reaction between an amine compound and phosgene in industrial scales. Alternatively, at present, the practical synthesis methods without using toxic phosgene include a method in which a carbamic acid ester is thermally decomposed, a synthesis method in which a nitro compound reacts with carbon monoxide in the presence of a palladium catalyst, etc.

When a polymer having a urethane bond is synthesized, a linear urethane polymer can be obtained from a diol compound having two hydroxyl groups per molecule and a compound having two isocyanate groups per molecule. The urethane bond formed by this reaction may also form a crosslinked polymer by further reacting with an isocyanate group.

Meanwhile, a crosslinked polymer can also be obtained by using a compound having three or more functional groups per molecule. For example, a polymeric diol component is caused to react with a diisocyanate component at such a ratio that isocyanate groups are in an excess amount to thus synthesize a prepolymer having an isocyanate group at the polymer terminal. This is caused to react with a crosslinking agent that is a compound having three or more hydroxyl groups per molecule, so that a crosslinked polymer can be obtained. Alternatively, a crosslinked polymer can also be obtained by reaction between a polymeric diol component and a compound having three or more isocyanate groups per molecule as a crosslinking agent.

Problems with the synthesis of crosslinked polymers by these methods include high viscosity of the compositions before curing. For example, in relation to the former prepolymer method, a product catalog of Sanyo Chemical Industries, Ltd. states that a prepolymer (product name: SANPRENE P-6090) obtained from polyoxytetramethylene glycol and 4,4'-diphenylmethane diisocyanate has a viscosity of 690 mPa·s at 80° C., and a prepolymer (product name: SANPRENE P-7315) obtained from polyesterpolyol and 4,4'-diphenylmethane diisocyanate has a viscosity of 1630 mPa·s at 80° C. High viscosity prepolymers make defoaming difficult after mixed with a crosslinking agent component.

Another problem with the method of obtaining a crosslinked polymer by reaction between a prepolymer having an isocyanate group at the polymer terminal and a compound having three or more hydroxyl groups per molecule is that the prepolymer may become a gel during storage. This is because an isocyanate group is such a highly reactive functional group with active hydrogen that this group reacts with water in air, for example.

As examples of the crosslinking agent having three isocyanate groups per molecule in the latter method, a product catalog of Asahi Kasei Corporation states that a biuret-type hexamethylene diisocyanate derivative product name Duranate 24A-100 has a viscosity of 1800 mPa·s at 25° C., an isocyanurate-type product name Duranate TPA-100 has a viscosity of 1400 mPa·s at 25° C., and another isocyanurate-type product name Duranate TKA-100 has a viscosity of 2600 mPa·s at 25° C. As described above, the higher the viscosity, the more difficult it is to perform defoaming after mixed with a crosslinking agent.

As means for lowering the viscosity of an isocyanate group-containing compound, an effective method is conceivably organosilicon compound derivative formation. It has been disclosed that such compound having both an isocyanate group and a polysiloxane group are useful as modifying agents for organic compounds or modifiers for polymers (Patent Documents 1, 2).

Patent Document 1 describes an organosilicon compound having one isocyanate group and one vinyl group per molecule, and an addition reaction between this vinyl group and a polysiloxane having hydrogen at one terminal makes it possible to obtain a polysiloxane having just one isocyanate group in a molecule.

Patent Document 2 discloses γ-tris(trimethylsiloxy)silylpropyl isocyanate, and synthesis methods thereof.

When used as modifying agents for organic compounds or modifiers for polymers, the organosilicon compounds described in Patent Documents 1 and 2 are required to have just one isocyanate group in a molecule to avoid crosslinking between reaction substrates.

As a method of obtaining an organosilicon compound having three or more isocyanate groups per molecule, it can be obtained by addition reaction between an organopolysiloxane having three or more Si-H groups per molecule and an isocyanate compound having an aliphatic unsaturated group at a terminal, for example, allyl isocyanate. However, allyl isocyanate has to be handled carefully because of the low boiling point, strong toxicity, and strong pungent odor. Further, allyl isocyanate is not economically preferable because it is expensive.

Moreover, an aminopolysiloxane is similarly obtained by addition reaction between an organopolysiloxane having three or more Si—H groups per molecule and an amine compound having an aliphatic unsaturated group at a terminal, for example, allylamine. Alternatively, an aminopolysiloxane can also be obtained by: adding, in place of allylamine, a compound having an amino group protected with a trialkylsilyl group, for example, N,N-bistrimethylsilylallylamine; and then removing the protective group.

Next, the aminopolysiloxane thus obtained is reacted with a halogenated formic acid ester, for example, phenyl chloroformate to form a phenyl carbamate derivative. The resultant is then subjected to thermal decomposition reaction to convert the phenyl carbamate group to an isocyanate group, so that an organosilicon compound having three or more isocyanate groups per molecule can be obtained. However, the thermal decomposition reaction of the phenyl carbamate group normally requires high temperature of 150 to 250° C. Hence, gelation may occur during the reaction, so that the target product is not obtained in some cases. Meanwhile, even if no gelation occurs, highly viscous product is obtained. Furthermore, the color changes from yellow to brown, resulting in opaque appearance. These are not suitable for use as a crosslinking agent for resins.

CITATION LIST

Patent Literature

Patent Document 1: JP H08-104755 A
Patent Document 2: JP 2001-026593 A

SUMMARY OF INVENTION

Technical Problem

The present invention has been made in view of such circumstances. An object of the present invention is to provide an organosilicon compound having three or more isocyanate groups per molecule, and being low in viscosity, suitable as a crosslinking agent, and excellent in handleability.

Solution to Problem

To achieve the object, the present invention provides an isocyanate group-containing organosilicon compound shown by the following general formula (1), $$R^1_aR^2_bSiO_{(4-a-b)/2} \quad (1)$$

wherein each $R^1$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; $R^2$ represents an organic group shown by a formula $-CH_2CH_2Si(CH_3)_2OSi(CH_3)_2CH_2CH_2CH_2NCO$; and "a" and "b" each represent a positive number satisfying $0.9 \leq a \leq 1.9$, $0.25 \leq b \leq 1.1$, and $1.9 \leq a+b \leq 2.8$, and the isocyanate group-containing organosilicon compound comprises three or more $R^2$ groups per molecule and has a viscosity at 25° C. of 100 $mm^2/s$ or less.

Such a compound makes it possible to provide an organosilicon compound having three or more isocyanate groups per molecule suitable as a crosslinking agent, low viscosity and excellent handleability.

Moreover, the present invention provides the isocyanate group-containing organosilicon compound shown by the following general formula (2), $$R^1_2R^3SiO(SiR^1_2O)_c(SiR^1R^2O)_dSiR^1_2R^3 \quad (2)$$

wherein $R^1$ and $R^2$ are as defined above, $R^3$ represents either $R^1$ or $R^2$, "c" represents an integer of 0 to 20, "d" represents an integer of 1 to 10, and "c+d" is an integer of 1 to 30.

Such a compound can further improve the effects of the present invention.

Further, the present invention provides the isocyanate group-containing organosilicon compound shown by the following general formula (3), $$R^1_eSi(OSiR^1_2R^2)_f \quad (3)$$

wherein $R^1$ and $R^2$ are as defined above, "e" represents 0 or 1, "f" represents 3 or 4, and "e+f" is 4.

Such a compound also can further improve the effects of the present invention.

Furthermore, the present invention provides the isocyanate group-containing organosilicon compound shown by the following general formula (4), (4)

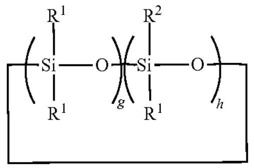

wherein $R^1$ and $R^2$ are as defined above, "g" represents an integer of 0 to 2, "h" represents an integer of 3 to 5, and "g+h" is an integer of 3 to 7.

Such a compound also can further improve the effects of the present invention.

Additionally, the present invention provides a method for producing the isocyanate group-containing organosilicon compound, the method comprising performing an addition reaction between $CH_2{=}CHSi(CH_3)_2OSi(CH_3)_2CH_2CH_2CH_2NCO$ and and an organohydrogenpolysiloxane shown by the following general formula (5), $$R^1_aH_bSiO_{(4-a-b)/2} \quad (5)$$

wherein $R^1$, "a", and "b" are as defined above.

Such a compound production method makes it possible to obtain an organosilicon compound having three or more isocyanate groups per molecule suitable as a crosslinking agent, low viscosity, and excellent handleability.

Moreover, the present invention provides a method for producing the isocyanate group-containing organosilicon compound, the method comprising performing an addition reaction between $CH_2{=}CHSi(CH_3)_2OSi(CH_3)_2CH_2CH_2CH_2NCO$ and an organohydrogenpolysiloxane shown by the following general formula (6), $$R^1_2R^4SiO(SiR^1_2O)_c(SiR^1HO)_dSiR^1_2R^4 \quad (6)$$

wherein $R^1$, "c", and "d" are as defined above, and $R^4$ represents either $R^1$ or H.

Such a compound production method makes it possible to efficiently produce the isocyanate group-containing organosilicon compound shown by the general formula (2).

Further, the present invention provides a method for producing the isocyanate group-containing organosilicon compound, the method comprising performing an addition reaction between $CH_2{=}CHSi(CH_3)_2OSi(CH_3)_2CH_2CH_2CH_2NCO$ and an organohydrogenpolysiloxane shown by the following general formula (7), $$R^1_eSi(OSiR^1_2H)_f \quad (7)$$

wherein $R^1$, "e", and "f" are as defined above.

Such a compound production method makes it possible to efficiently produce the isocyanate group-containing organosilicon compound shown by the general formula (3).

Furthermore, the present invention provides a method for producing the isocyanate group-containing organosilicon compound, the method comprising performing an addition reaction between $CH_2{=}CHSi(CH_3)_2OSi(CH_3)_2CH_2CH_2CH_2NCO$ and an organohydrogenpolysiloxane shown by the following general formula (8), (8)

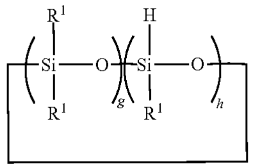

wherein $R^1$, "g", and "h" are as defined above.

Such a compound production method makes it possible to efficiently produce the isocyanate group-containing organosilicon compound shown by the general formula (4).

Advantageous Effects of Invention

The inventive organosilicon compound has three or more isocyanate groups per molecule, which are highly reactive with a hydroxyl group and an amino group. Despite this fact, the inventive organosilicon compound has a low viscosity of 100 $mm^2/s$ or less at 25° C. This low viscosity facilitates uniform mixing with a polymeric polyol compound or polymeric polyamine compound, and facilitates defoaming after the mixing. Thus, the inventive compound is useful as a curing agent to obtain a cured mold product. Moreover, the inventive compound is transparent, so that the cured mold product is not opaque.

DESCRIPTION OF EMBODIMENTS

As noted above, there have been demands for the development of an organosilicon compound which has three or more isocyanate groups per molecule, and which is suitable as a crosslinking agent, low in viscosity, and excellent in handleability.

The present inventor and colleagues have earnestly studied to achieve the above object and consequently found an isocyanate group-containing organosilicon compound having the following particular structure. This finding has led to the present invention.

Specifically, the present invention is an isocyanate group-containing organosilicon compound shown by the following general formula (1), $$R^1_aR^2_bSiO_{(4-a-b)/2} \quad (1)$$

wherein each $R^1$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; $R^2$ represents an organic group shown by a formula $—CH_2CH_2Si(CH_3)_2OSi(CH_3)_2CH_2CH_2CH_2NCO$; and "a" and "b" each represent a positive number satisfying 0.9≤a≤1.9, 0.25≤b≤1.1, and 1.9≤a+b≤2.8, and the isocyanate group-containing organosilicon compound comprises three or more $R^2$ groups per molecule and has a viscosity at 25° C. of 100 $mm^2/s$ or less.

Hereinafter, the present invention will be described in detail, but the present invention is not limited thereto.

The inventive isocyanate group-containing organosilicon compound is represented by the following general formula (1).

$$R^1_aR^2_bSiO_{(4-a-b)/2} \quad (1)$$

In the formula (1), $R^1$'s are identical to or different from one another, and are each a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms. $R^1$ has no aliphatic unsaturated group. $R^2$ is an organic group shown by a formula $—CH_2CH_2Si(CH_3)_2OSi(CH_3)_2CH_2CH_2CH_2NCO$. "a" and "b" are each a positive number satisfying 0.9≤a≤1.9, 0.25≤b≤1.1, and 1.9≤a+b≤2.8.

The isocyanate group-containing organosilicon compound has three or more. $R^2$ groups per molecule, and the viscosity at 25° C. thereof is 100 $mm^2/s$ or less.

Note that the viscosity is measured at 25° C. by using a modified Ostwald capillary viscometer.

$R^1$ may be linear, branched, or cyclic. Specific examples thereof can include: alkyl groups, such as a methyl group, an ethyl group, a propyl group, a butyl group, a pentyl group, a hexyl group, a heptyl group, an octyl group, a nonyl group, and a decyl group; saturated alicyclic hydrocarbon groups, such as a cyclopentyl group and a cyclohexyl group; aryl groups, such as a phenyl group and a tolyl group; aralkyl groups, such as a benzyl group and a phenylethyl group; fluorine-substituted alkyl groups, such as a trifluoropropyl group and a nonafluorohexyl group; etc. $R^1$ is preferably a methyl group or a phenyl group.

"a" is 0.9 to 1.9, preferably 1.0 to 1.8. "b" is 0.25 to 1.1, preferably 0.4 to 1.0. "a+b" is 1.9 to 2.8, preferably 2.0 to 2.6. This is because if "a" is smaller than 0.9, the silicon unit forming the present compound is expensive and not economically preferable. If "a" is larger than 1.9, it is difficult to prepare three or more $R^2$ groups per molecule and make the viscosity at 25° C. 100 $mm^2/s$ or less. If "b" is smaller than 0.25, it is difficult to prepare three or more $R^2$ groups per molecule and make the viscosity at 25° C. 100 $mm^2/s$ or less. If "b" is larger than 1.1, the silicon unit forming the present compound is not economically preferable. If a+b is smaller than 1.9, the silicon unit forming the present compound is not economically preferable. If a+b is larger than 2.8, it is difficult to prepare three or more $R^2$ groups per molecule and make the viscosity at 25° C. 100 $mm^2/s$ or less.

The inventive isocyanate group-containing organosilicon compound is preferably shown by any of the following general formulae (2) to (4).

The inventive isocyanate group-containing organosilicon compound is preferably an isocyanate group-containing organosilicon compound with a linear structure shown by the following general formula (2).

$$R^1_2R^3SiO(SiR^1_2O)_c(SiR^1R^2O)_dSiR^1_2R^3 \quad (2)$$

In the formula (2), $R^1$ and $R^2$ are as defined above. $R^3$ is either $R^1$ or $R^2$, and the number of $R^2$ groups is three or more per molecule. "c" represents an integer of 0 to 20, "d" represents an integer of 1 to 10, and "c+d" is an integer of 1 to 30.

The viscosity at 25° C. thereof is 100 $mm^2/s$ or less.

"c" is 0 to 20, preferably 0 to 10. "d" is 1 to 10, preferably 1 to 5. c+d is 1 to 30, preferably 1 to 10. When "c" is 20 or less, it is easy to prepare three or more $R^2$ groups per molecule and make the viscosity at 25° C. 100 $mm^2/s$ or less. When "d" is 10 or less and "c+d" is 30 or less, it is similarly easy to make the viscosity at 25° C. 100 $mm^2/s$ or less. Additionally, as necessary, an $R^1SiO_{1.5}$ unit or an $SiO_2$ unit may be incorporated as a siloxane-constituting unit.

Moreover, the inventive isocyanate group-containing organosilicon compound is preferably an isocyanate group-containing organosilicon compound with a branched structure shown by the following general formula (3).

$$R^1_eSi(OSiR^1_2R^2)_f \quad (3)$$

In the formula (3), $R^1$ and $R^2$ are as defined above. "e" represents 0 or 1, "f" represents 3 or 4, and "e+f" is 4.

This isocyanate group-containing organosilicon compound shown by the general formula (3) has three to four $R^2$ groups per molecule and a viscosity at 25° C. of 100 $mm^2/s$ or less.

Furthermore, the inventive isocyanate group-containing organosilicon compound is preferably an isocyanate group-containing organosilicon compound with a cyclic structure shown by the following general formula (4).

(4)

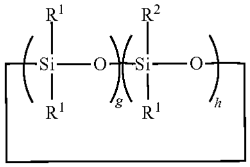

In the formula (4), $R^1$ and $R^2$ are as defined above, "g" represents an integer of 0 to 2, "h" represents an integer of 3 to 5, and "g+h" is an integer of 3 to 7.

This isocyanate group-containing organosilicon compound shown by the general formula (4) has three or more $R^2$ groups per molecule and a viscosity at 25° C. of 100 $mm^2$/s or less.

According to the present invention, it is possible to provide isocyanate group-containing organosilicon compounds shown by the general formulae (2) to (4) having desired linear, branched, or cyclic structure.

Hereinbelow, methods for producing the compounds shown by the general formulae (1) to (4) will be described.

The inventive isocyanate group-containing organosilicon compounds can be obtained by a hydrosilylation reaction between an organohydrogenpolysiloxane corresponding to one of compounds shown by the following general formulae (5) to (8) and an alkenyl group-containing isocyanate compound $CH_2{=}CHSi(CH_3)_2OSi(CH_3)_2CH_2CH_2CH_2NCO$.

The invention isocyanate group-containing organosilicon compound shown by the general formula (1) can be obtained by hydrosilylation between the alkenyl group-containing isocyanate compound and an organohydrogenpolysiloxane shown by the following general formula (5) in the presence of a platinum-based catalyst, for example.

$$R^1_aH_bSiO_{(4-a-b)/2} \quad (5)$$

In the formula (5), $R^1$, "a", and "b" are as defined above.

Similarly, when a target product is a compound with a linear structure shown by the general formula (2), it can be obtained by an addition reaction between the alkenyl group-containing isocyanate compound and an organohydrogenpolysiloxane shown by the following general formula (6).

$$R^1_2R^4SiO(SiR^1_2O)_c(SiR^1HO)_dSiR^1_2R^4 \quad (6)$$

In the formula (6), $R^1$, "c", and "d" are as defined above, and $R^4$ is either $R^1$ or H.

When a target product is a compound with a branched structure shown by the general formula (3), it can be obtained by an addition reaction between the alkenyl group-containing isocyanate compound and an organohydrogenpolysiloxane shown by the following general formula (7).

$$R^1_eSi(OSiR^1_2H)_f \quad (7)$$

In the formula (7), $R^1$, "e", and "f" are as defined above.

Further, when a target product is a compound with a cyclic structure shown by the general formula (4), it can be obtained by an addition reaction between the alkenyl group-containing isocyanate compound and an organohydrogenpolysiloxane shown by the following general formula (8).

(8)

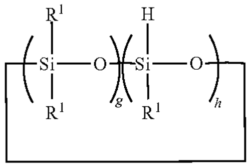

In the formula (8), $R^1$, $R^2$, "g" and "h" are as defined above.

The addition reactions between the organohydrogenpolysiloxanes and the alkenyl group-containing isocyanate compound can be performed according to a conventionally known method. For example, relative to 1 mol of hydrogen atoms directly bonded to silicon atoms in the organohydrogenpolysiloxanes shown by the general formulae (5) to (8), the alkenyl group-containing isocyanate compound may be added in an amount of 1 molar equivalent or more for the reaction. The reaction temperature is not particularly limited. The temperature preferably does not exceed the boiling point of a solvent to be used. For example, the reaction is preferably performed at a temperature of approximately 0° C. to approximately 120° C. The reaction may be carried out in the presence of a solvent, hydrosilylation catalyst, or stabilizer. The solvent, hydrosilylation catalyst, and stabilizer may be conventionally known materials and are not particularly limited.

In the reaction, the alkenyl group-containing isocyanate compound is preferably added in an amount of 1 molar equivalent or more relative to 1 mol of hydrogen atoms directly bonded to silicon atoms in the organohydrogenpolysiloxane. The amount is more preferably 1.0 to 3.0 molar equivalents, further preferably 1.1 to 2.0 molar equivalents, and particularly preferably 1.2 to 1.5 molar equivalents.

The hydrosilylation catalyst is, for example, a noble metal catalyst, particularly preferably a platinum catalyst derived from chloroplatinic acid. Especially, chloride ions of chloroplatinic acid may be completely neutralized with sodium bicarbonate to improve the stability of the platinum catalyst. For example, a complex (Karstedt catalyst) of 1,1,3,3-tetramethyl-1,3-divinyldisiloxane and a neutralized product of chloroplatinic acid with sodium bicarbonate is more preferable.

The hydrosilylation catalyst may be added in a catalytic amount to advance the reaction. For example, a complex of 1,1,3,3-tetramethyl-1,3-divinyldisiloxane and a neutralized product of chloroplatinic acid with sodium bicarbonate may be used in an amount of 1 ppm to 80 ppm in terms of platinum relative to the mass of the hydrogensiloxane compound shown by one of the formulae (5) to (8).

The addition reaction performed in the presence of a platinum-based catalyst does not necessarily require a solvent, or may employ a hydrocarbon solvent, such as isooctane, toluene, and xylene; an ether solvent, such as tetrahydrofuran, dibutyl ether, monoglyme, and diglyme; or an aprotic solvent, such as dimethylformamide, dimethylacetamide, dimethylsulfoxide, and dimethylimidazolidinone.

The isocyanate compound $CH_2{=}CHSi(CH_3)_2OSi(CH_3)_2CH_2CH_2CH_2NCO$ used in the addition reaction can be synthesized by the following known methods (A) to (C).

(A) isocyanate formation through reaction of $CH_2{=}CHSi(CH_3)_2OSi(CH_3)_2CH_2CH_2CH_2NH_2$ with phosgene;

(B) isocyanate formation through reaction of $CH_2{=}CHSi(CH_3)_2OSi(CH_3)_2CH_2CH_2CH_2I$ with potassium cyanate; and (C) isocyanate formation through reaction of $CH_2{=}CHSi(CH_3)_2OSi(CH_3)_2CH_2CH_2CH_2NH_2$ with phenyl chloroformate or diphenyl carbonate to obtain phenyl carbamate ester shown by $CH_2{=}CHSi(CH_3)_2OSi(CH_3)_2CH_2CH_2CH_2NHCOOPh$, followed by thermal decomposition reaction.

Among these, preferable is the synthesis method (C) in which phenyl carbamate ester is thermally decomposed in the presence of a trialkylchlorosilane and an acid scavenger as disclosed in Patent Document 1 mentioned above.

As described above, an organohydrogenpolysiloxane with a desired structure can be used as a raw material to produce the inventive isocyanate group-containing organosilicon compound, so that linear, branched, or cyclic structure can be prepared at will easily, too.

EXAMPLE

Hereinafter, the present invention will be specifically described with reference to Examples and Comparative Examples. However, the present invention is not limited thereto.

Additionally, each viscosity was measured at a temperature of 25° C. with a modified Ostwald capillary viscometer.

Synthesis Example

Into a flask, 331.2 g of potassium carbonate was introduced together with 300.0 g of water and uniformly dissolved. Then, 180.0 g of ethyl acetate and 150.0 g of toluene were added. After the flask was ice-cooled, 217.0 g of the following aminovinyldisiloxane was added.

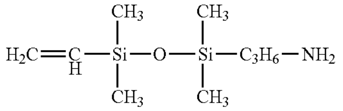

Subsequently, 156.5 g of phenyl chloroformate was added dropwise at such a speed that the inner temperature did not exceed 10° C. The inner temperature was maintained at 10° C. or less, and the reaction was allowed to proceed for another 2 hours. Thereafter, 800 g of water was added to dissolve the resulting salt. After the aqueous layer was separated, the organic layer was washed with water and dried with anhydrous sodium sulfate. After the filtration, the resulting solution was concentrated under reduced pressure. Thus, 336.1 g of the following phenyl carbamate derivative was obtained.

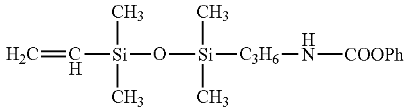

Next, 336.1 g of the phenyl carbamate derivative synthesized above and 300.0 g of xylene were introduced into a flask. 131.0 g of triethylamine was added thereto and heated such that the inner temperature reached 80° C. Then, 129.9 g of trimethylchlorosilane was added dropwise. After the completion of the dropwise addition, the mixture was heated and stirred at 100° C. for 1 hour and subsequently at 120° C. for 6 hours. After cooling to room temperature, the resulting salt was filtered. The filtrate was washed with 300 g of water, and then dried with anhydrous sodium sulfate. After the filtration, distillation was performed under reduced pressure. Thus, 155.3 g of the following target product was obtained: 1-(3-isocyanatopropyl)-1,1,3,3-tetramethyl-3-vinyldisiloxane [A].

[A]

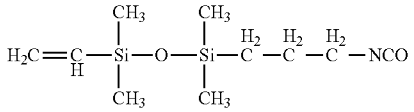

The boiling point was 64.0 to 65.0° C./300 Pa, and the purity was 99.9% according to gas chromatography.

Example 1

Into a flask, 121.5 g of the isocyanate-vinyldisiloxane [A] obtained in Synthesis Example was introduced. The flask was purged with argon atmosphere and then heated such that the inner temperature reached 70° C. After 0.04 g of a Karstedt catalyst (platinum concentration: 3%) was added, 27.3 g of an organohydrogenpolysiloxane shown by the following formula [H-1] was added dropwise. After the completion of the dropwise addition, the reaction was allowed to proceed at 110° C. for 5 hours.

[H-1]

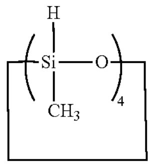

After the reaction, the unreacted materials were distilled off by heating under reduced pressure. Thus, 126.1 g of an isocyanate siloxane of the following formula [I-1] was obtained.

[I-1]

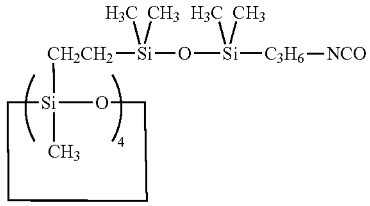

In the general formula (1), a=1 and b=1. In the general formula (4), g=0, h=4, and $R^1$—a methyl group. This liquid had colorless transparent appearance, the viscosity at 25° C. was 41.6 $mm^2/s$, and the isocyanate equivalent weight was 318 g/mol.

Example 2

Into a flask, 126.0 g of the isocyanate-vinyldisiloxane [A] obtained in Synthesis Example was introduced. The flask was purged with argon atmosphere and then heated such that the inner temperature reached 70° C. After 0.06 g of a Karstedt catalyst (platinum concentration: 3%) was added, 40.3 g of an organohydrogenpolysiloxane shown by the following formula [H-2] was added dropwise. After the completion of the dropwise addition, the reaction was allowed to proceed at 110° C. for 5 hours.

[H-2]

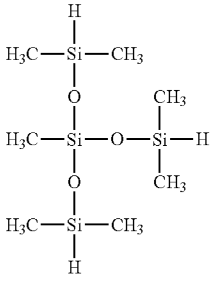

After the reaction, the unreacted materials were distilled off by heating under reduced pressure. Thus, 140.4 g of an isocyanate siloxane of the following formula [I-2] was obtained.

[I-2]

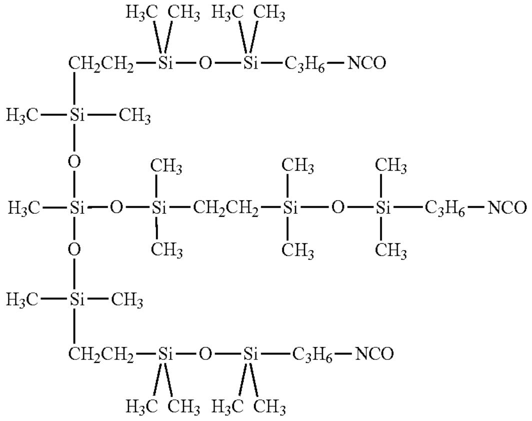

In the general formula (1), a=1.75 and b=0.75. In the general formula (3), e=1, f=3, and $R^1$=a methyl group. This liquid had colorless transparent appearance, the viscosity at 25° C. was 20.7 $mm^2/s$, and the isocyanate equivalent weight was 359 g/mol.

Example 3

Into a flask, 91.9 g of the isocyanate-vinyldisiloxane [A] obtained in Synthesis Example was introduced. The flask was purged with argon atmosphere and then heated such that the inner temperature reached 70° C. After 0.04 g of a Karstedt catalyst (platinum concentration: 3%) was added, 38.2 g of an organohydrogenpolysiloxane shown by the following formula [H-3] was added dropwise. After the completion of the dropwise addition, the reaction was allowed to proceed at 110° C. for 5 hours.

[H-3]

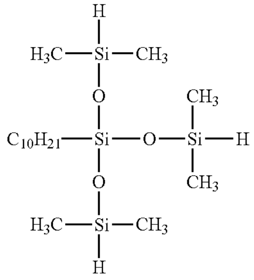

After the reaction, the unreacted materials were distilled off by heating under reduced pressure. Thus, 103.4 g of an isocyanate siloxane of the following formula [I-3] was obtained.

[I-3]

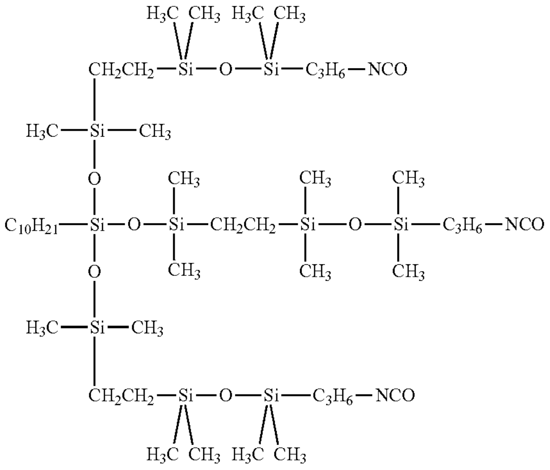

In the general formula (1), a=1.75 and b=0.75. In the general formula (3), e=1, f=3, and $R^1$=a methyl group and a decyl group. This liquid had colorless transparent appearance, the viscosity at 25° C. was 29.6 $mm^2/s$, and the isocyanate equivalent weight was 382 g/mol.

Example 4

Into a flask, 78.4 g of the isocyanate-vinyldisiloxane [A] obtained in Synthesis Example was introduced. The flask was purged with argon atmosphere and then heated such that the inner temperature reached 70° C. After 0.04 g of a Karstedt catalyst (platinum concentration: 3%) was added, 27.3 g of an organohydrogenpolysiloxane shown by the following formula [H-4] was added dropwise. After the completion of the dropwise addition, the reaction was allowed to proceed at 110° C. for 5 hours.

[H-4]

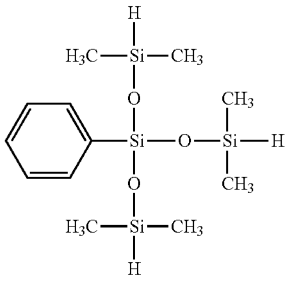

After the reaction, the unreacted materials were distilled off by heating under reduced pressure. Thus, 83.0 g of an isocyanate siloxane of the following formula [I-4] was obtained.

[I-4]

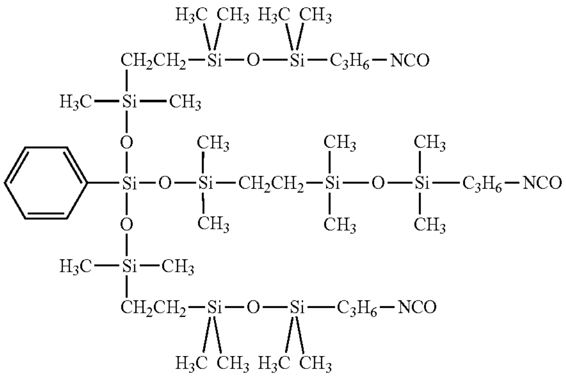

In the general formula (1), a=1.75 and b=0.75. In the general formula (3), e=1, f=3, and $R^1$=a methyl group and a phenyl group. This liquid had colorless transparent appearance, the viscosity at 25° C. was 28.6 $mm^2/s$, and the isocyanate equivalent weight was 374 g/mol.

Example 5

Into a flask, 79.7 g of the isocyanate-vinyldisiloxane [A] obtained in Synthesis Example was introduced. The flask was purged with argon atmosphere. Then, 20 ml of toluene was added therein and the resultant was heated such that the inner temperature reached 70° C. After 0.06 g of a Karstedt catalyst (platinum concentration: 3%) was added, 16.4 g of an organohydrogenpolysiloxane shown by the following formula [H-5] was added dropwise. After the completion of the dropwise addition, the reaction was allowed to proceed at 110° C. for 5 hours.

[H-5]

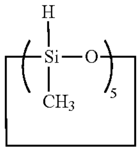

After the reaction, the solvent and the unreacted materials were distilled off by heating under reduced pressure. Thus, 77.8 g of an isocyanate siloxane of the following formula [I-5] was obtained.

[I-5]

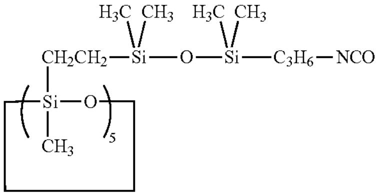

In the general formula (1), a=1 and b=1. In the general formula (4), g=0, h=5, and $R^1$=a methyl group. This liquid had pale yellow transparent appearance, the viscosity at 25° C. was 70.6 $mm^2/s$, and the isocyanate equivalent weight was 369 g/mol.

Example 6

Into a flask, 90.4 g of the isocyanate-vinyldisiloxane [A] obtained in Synthesis Example was introduced. The flask was purged with argon atmosphere. Then, 15 ml of toluene was added therein and the resultant was heated such that the inner temperature reached 70° C. After 0.04 g of a Karstedt catalyst (platinum concentration: 3%) was added, 25.4 g of an organohydrogenpolysiloxane shown by the following formula [H-6] was added dropwise. After the completion of the dropwise addition, the reaction was allowed to proceed at 110° C. for 5 hours.

[H-6]

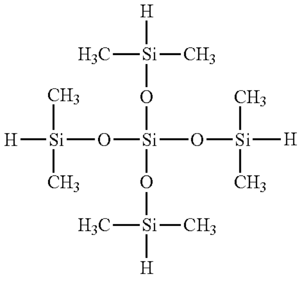

After the reaction, the solvent and the unreacted materials were distilled off by heating under reduced pressure. Thus, 94.7 g of an isocyanate siloxane of the following formula [I-6] was obtained.

[I-6]

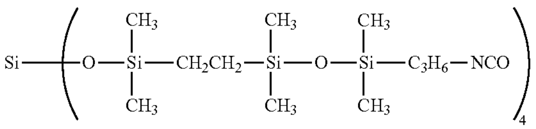

In the general formula (1), a=1.6 and b=0.8. In the general formula (3), e=0, f=4, and $R^1$=a methyl group. This liquid had colorless transparent appearance, the viscosity at 25° C. was 29.2 $mm^2/s$, and the isocyanate equivalent weight was 375 g/mol.

Example 7

Into a flask, 25.0 g of an organohydrogenpolysiloxane shown by the following formula [H-7] was introduced. The flask was purged with argon atmosphere. Then, 15 ml of toluene was added therein and the resultant was heated such that the inner temperature reached 70° C. After 0.06 g of a Karstedt catalyst (platinum concentration: 3%) was added, 34.8 g of the isocyanate-vinyldisiloxane [A] obtained in Synthesis Example was added dropwise. After the completion of the dropwise addition, the reaction was allowed to proceed at 110° C. for 5 hours.

[H-7]

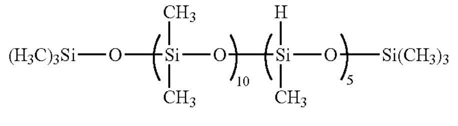

After the reaction, the solvent and the unreacted materials were distilled off by heating under reduced pressure, 47.9 g of an isocyanate siloxane of the following formula [1-7] was obtained.

[I-7]

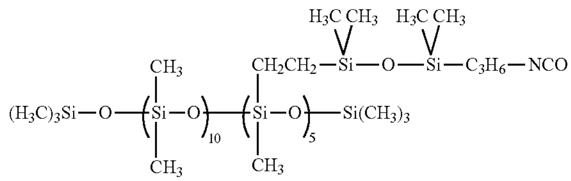

In the general formula (1), a=1.82 and b=0.29. In the general formula (2), c=10, d=5, and $R^1=R^3$=a methyl group. This liquid had yellow transparent appearance, the viscosity at 25° C. was 84.1 $mm^2/s$, and the isocyanate equivalent weight was 553 g/mol.

Example 8

Into a flask, 51.2 g of the isocyanate-vinyldisiloxane [A] obtained in Synthesis Example was introduced. The flask was purged with argon atmosphere and then heated such that the inner temperature reached 70° C. After 0.06 g of a Karstedt catalyst (platinum concentration: 3%) was added, 15.0 g of an organohydrogenpolysiloxane shown by the following formula [H-8] was added dropwise. After the completion of the dropwise addition, the reaction was allowed to proceed at 110° C. for 5 hours.

[H-8]

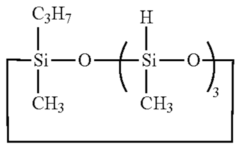

After the reaction, the unreacted materials were distilled off by heating under reduced pressure. Thus, 51.1 g of an isocyanate siloxane of the following formula [I-8] was obtained.

[I-8]

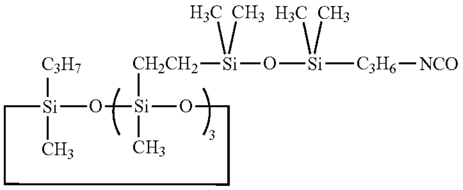

In the general formula (1), a=1.25 and b=0.75. In the general formula (4), g=1, h=3, and $R^1$=a methyl group and a propyl group. This liquid had pale yellow transparent appearance, the viscosity at 25° C. was 34.0 $mm^2/s$, and the isocyanate equivalent weight was 383 g/mol.

From the foregoing, the present invention makes it possible to obtain organosilicon compounds having three or more isocyanate groups per molecule, and being suitable as a crosslinking agent, low in viscosity, and excellent in handleability. Examples of crosslinking agents can include an isocyanurate-type hexamethylene diisocyanate derivative product name Duranate TKA-100. If its density is 1 $g/cm^3$, the viscosity is 2600 $mm^2/s$. In contrast, according to the present invention, the viscosity is 100 $mm^2/s$ or less, so that low viscosity is achieved. In addition, since the inventive organosilicon compounds have low viscosity, this facilitates uniform mixing with polymeric polyol compounds or polymeric polyamine compounds, and also facilitates defoaming after the mixing. Thus, the inventive organosilicon compounds are useful as curing agents for obtaining cured mold products.

It should be noted that the present invention is not limited to the above-described embodiments. The embodiments are just examples, and any embodiments that substantially have the same feature and demonstrate the same functions and effects as those in the technical concept disclosed in claims of the present invention are included in the technical scope of the present invention.

The invention claimed is:

1. An isocyanate group-containing organosilicon compound shown by the following general formula (3), $$R^1_eSi(OSiR^1_2R^2)_f \quad (3)$$

wherein each $R^1$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; $R^2$ represents an organic group shown by a formula $—CH_2CH_2Si(CH_3)_2OSi(CH_3)_2CH_2CH_2CH_2NCO$; and "e" represents 0 or 1, "f" represents 3 or 4, and "e+f" is 4.

2. A method for producing the isocyanate group-containing organosilicon compound according to claim 1, the method comprising performing an addition reaction between $CH_2=CHSi(CH_3)_2OSi(CH_3)_2CH_2CH_2CH_2NCO$ and an organohydrogenpolysiloxane shown by the following general formula (7), $$R^1_eSi(OSiR^1_2H)_f \quad (7)$$

wherein $R^1$, "e", and "f" are as defined above.

* * * * *